(12) United States Patent
Harding et al.

(10) Patent No.: US 8,001,058 B1
(45) Date of Patent: Aug. 16, 2011

(54) EVALUATING ITEM SELLERS TO PROMOTE SELLERS, INFORM ITEM PURCHASING DECISIONS AND BUILD TRUST IN A MULTIPLE-SELLER MARKETPLACE

(75) Inventors: James A. Harding, Issaquah, WA (US); Sean M. O'Neill, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 0 days.

(21) Appl. No.: 12/843,307

(22) Filed: Jul. 26, 2010

Related U.S. Application Data (62) Division of application No. 10/750,163, filed on Dec. 31, 2003, now Pat. No. 7,778,878.

(51) Int. Cl.
*G06Q 30/00* (2006.01)

(52) U.S. Cl. ........................ 705/347; 705/26.1

(58) Field of Classification Search .............. 705/26, 705/27, 26.1, 347
See application file for complete search history.

(56) References Cited

U.S. PATENT DOCUMENTS

| | | | |
|---|---|---|---|
| 4,992,940 | A | 2/1991 | Dworkin |
| 5,734,890 | A | 3/1998 | Case et al. |
| 5,960,411 | A | 9/1999 | Hartman et al. |
| 6,574,608 | B1 | 6/2003 | Dahod et al. |
| 6,662,192 | B1 | 12/2003 | Rebane |
| 6,917,941 | B2 | 7/2005 | Wight et al. |
| 7,035,816 | B2 | 4/2006 | Jankelewitz |
| 7,296,053 | B2 | 11/2007 | Abdulhayoglu |
| 7,302,429 | B1 * | 11/2007 | Wanker .............................. 1/1 |
| 7,600,029 | B1 * | 10/2009 | Mashinsky ................. 709/228 |
| 2001/0041996 | A1 * | 11/2001 | Eder ................................. 705/7 |
| 2001/0054008 | A1 | 12/2001 | Miller et al. |
| 2002/0107861 | A1 | 8/2002 | Clendinning et al. |
| 2002/0128920 | A1 | 9/2002 | Chopra |
| 2002/0147657 | A1 | 10/2002 | Callender et al. |

(Continued)

FOREIGN PATENT DOCUMENTS

| WO | WO 01/54033 | 7/2001 |
|---|---|---|
| WO | WO 02073356 A2 | 9/2002 |

OTHER PUBLICATIONS

Finerty, Judy, "Build Your Business By Phone," Target Marketing, Philadelphia, Jan. 1992, vol. 15, iss. 1, p. 23.*
Business Editors & E-Commerce Writers, "PriceGrabber Introduces Merchant Ratings by Shoppers," Business Wire, New York, Aug. 7, 2001, p. 1.

(Continued)

*Primary Examiner* — Amee A Shah
(74) *Attorney, Agent, or Firm* — Knobbe, Martens, Olson & Bear LLP (57) ABSTRACT

A facility for responding to a request for information about an item. The facility receives a request for information about the item. Among a plurality of sellers, the facility identifies those sellers (1) that are offering the item for sale, (2) whose availability level for the selected item exceeds a predetermined availability threshold, and (3) that have a seller score relating to a number of different items offered for sale by the seller that exceeds a predetermined score threshold. The facility uses the identified sellers and the price of the item to select the featured seller of the item. The facility replies to the request for information with a web page containing both information describing the item and a control that can be activated to order the item from the featured seller.

20 Claims, 8 Drawing Sheets

U.S. PATENT DOCUMENTS

| | | | |
|---|---|---|---|
| 2002/0174076 A1 | 11/2002 | Bertani | |
| 2003/0004855 A1* | 1/2003 | Dutta et al. | 705/37 |
| 2003/0023499 A1 | 1/2003 | Das et al. | |
| 2003/0055723 A1 | 3/2003 | English | |
| 2003/0074298 A1* | 4/2003 | Daum | 705/37 |
| 2004/0044563 A1* | 3/2004 | Stein | 705/10 |
| 2005/0010494 A1 | 1/2005 | Mourad et al. | |

OTHER PUBLICATIONS

Author unknown, "BizRate.com to Acquire eBoodle.com and Offer A Powerful Online Shopping Solution," PR Newswore, New York, Aug. 3, 2000, p. 1.

International Search Report for International Application No. PCT/US04/42916, Amazon Technologies, Inc., Aug. 2, 2006.

* cited by examiner

*FIG. 6* seller rating table 700

| seller identifier | seller name | feedback average | on-time shipping percentage | score | recommended seller |
|---|---|---|---|---|---|
| 1 | Office Central | 4.9 | 100 | 98 | yes |
| 2 | Software Palace | 3.2 | 88 | 52 | no |
| 5 | Walter's Sporting Goods | 5.0 | 92 | 66 | no |
| 6 | Computer Planet | 4.7 | 97 | 82 | yes |
| 7 | Healthy Housewares | 4.1 | 78 | 44 | no |
| 8 | Puppets and More | 3.6 | 58 | 76 | no |
| 10 | Vista Photography | 2.1 | 99 | 61 | no |
| ... | ... | ... | ... | ... | ... |

EVALUATING ITEM SELLERS TO PROMOTE SELLERS, INFORM ITEM PURCHASING DECISIONS AND BUILD TRUST IN A MULTIPLE-SELLER MARKETPLACE

CROSS-REFERENCE TO RELATED APPLICATIONS

This application is a divisional of U.S. patent application Ser. No. 10/750,163, filed Dec. 31, 2003, entitled "PROFILING ITEM SELLERS TO INFORM ITEM PURCHASING DECISIONS AND BUILD TRUST IN A MULTIPLE-SELLER MARKETPLACE" which is incorporated by reference herein in its entirety.

TECHNICAL FIELD

The present invention is directed to the field of electronic commerce.

BACKGROUND

Electronic commerce permits buyers to purchase products, services, and other items from sellers via data networks such as the Internet. In some cases, a seller provides a web site that both contains information about the items offered for sale by the seller and enables buyers to place orders for these items.

While some electronic commerce sellers provide their own individual web sites, other sellers may offer items for sale within a "multiple-seller marketplace," a single web site that enables buyers to place orders with any of a number of different sellers.

An operator of a multiple-seller marketplace may be motivated to ensure that sellers that participate in the marketplace to adhere to high standards. Some marketplaces may promote to buyers sellers that do adhere to high standards, which can help to build trust in these sellers, and marketplace as a whole.

Conventionally, marketplace operators solicit feedback on sellers from buyers—typically a quantitative rating and/or textual narrative—and publish this feedback to buyers in the marketplace.

This conventional approach has several significant disadvantages. First, the ratings can be unfairly manipulated by buyers, or even by sellers impersonating buyers. Second, the ratings omit potentially important information, such as information: (1) known only to the infrastructure provider, (2) whose provision does not specifically occur to past buyers, or (3) whose importance does not occur to future buyers.

In view of these disadvantages, a more robust approach to rating sellers in a multiple-seller marketplace would have significant utility.

DETAILED DESCRIPTION

A software facility for profiling item sellers ("the facility") is described. In some embodiments, the facility scores each of a number of sellers participating in a multi-seller marketplace. The scores attributed to sellers by the facility may be used to determine how each seller is promoted in the marketplace. As an example, a seller's score may be used to determine whether the marketplace displays a designation of approval with seller's name. A seller's score—alone, or together with other factors—may also be used to determine whether the seller is eligible to appear as the "featured seller" of an item, from which it is easier for buyers to order the item. Other factors sometimes incorporated in the featured seller determination, such as price, can make this feature—and, in turn, the marketplace—more valuable to sellers.

In some embodiments, each seller's score incorporates information about the seller's performance that is available to the operator of the marketplace, such as the rate at which the seller's buyers seek refunds, the average amount of time it takes the seller to fulfill orders, the rate at which the seller's buyers cause their transactions to be "charged back" via their credit card issuers, etc. In some cases, a seller's score further incorporates additional information specifically solicited from a buyer in response to an event; such as the reason the buyer cancelled an order with the seller after being placed.

By using techniques such as those described above, the facility encourages sellers participating in the marketplace to adhere to high standards of conduct by creating market pressure for sellers to perform well. In turn, this often enhances the confidence of buyers in individual sellers, as well as the marketplace as a whole, while also making the marketplace more profitable to operate. The facility further helps buyers to make informed purchase decisions. As one example, a buyer may decide to order an item from an underperforming seller only if the buyer receives a discount from that seller adequate to compensate the buyer for expected underperformance by the seller on the order.

Figure 1:
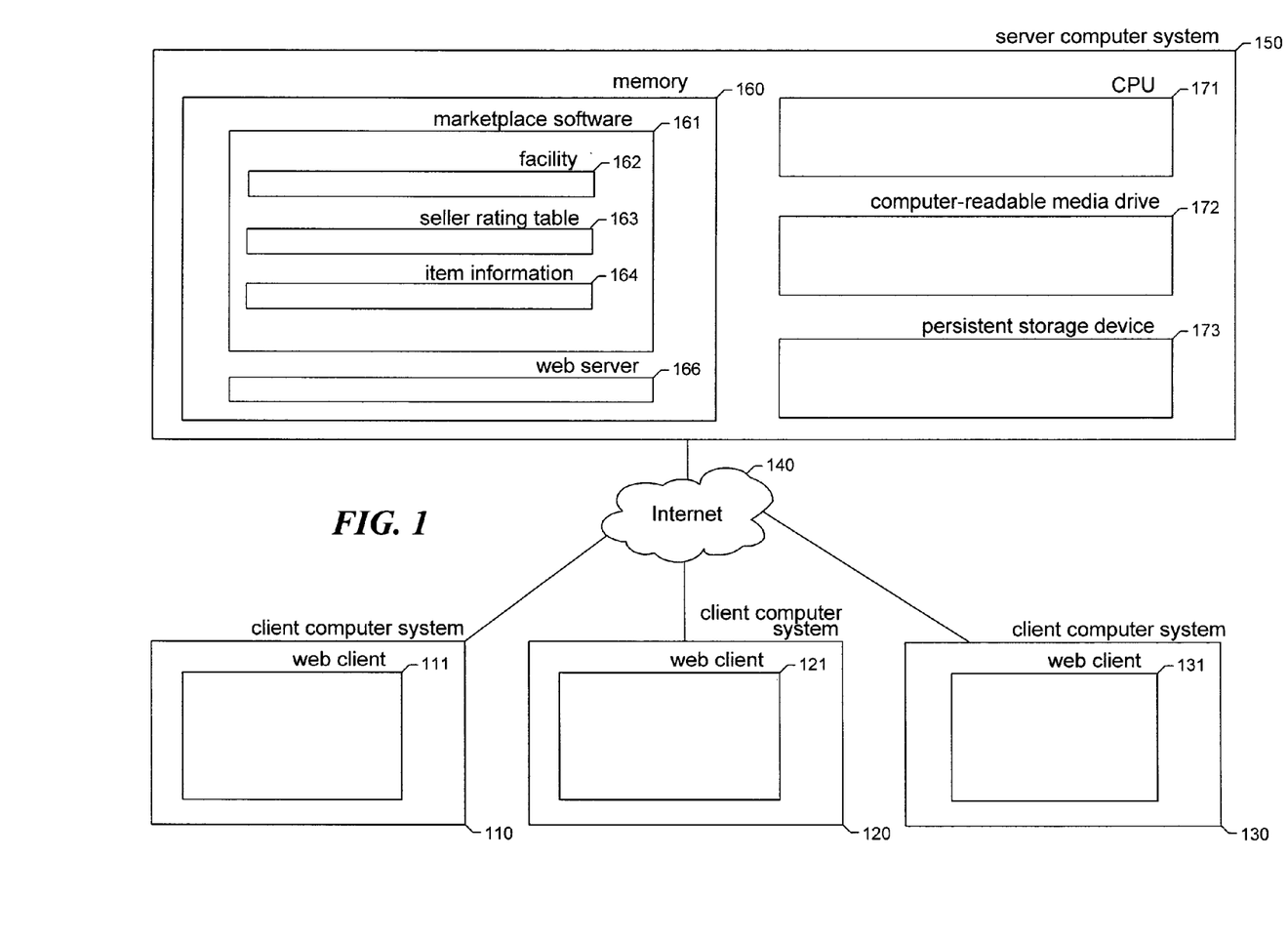
FIG. 1 is a high-level block diagram showing a typical environment in which the facility operates.

FIG. 1 is a high-level block diagram showing a typical environment in which the facility operates. The block diagram shows several client computer systems, such as client computer systems 110, 120, and 130. Each of the client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains multi-seller marketplace software 161 incorporating both the facility 162 and data typically used by facility, such as a seller rating table 163 used to rate sellers, and item information 164 used in constructing item detail pages. The memory preferably further contains a web server computer program 166 for delivering web pages in response to requests from web clients. While items 161-166 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161, 162, and 166, and a computer-readable medium drive 173 for reading information or installing programs such as the facility from computer-readable media, such as a floppy disk, a CD-ROM, or a DVD.

While various embodiments are described in terms in the environment described above, those skilled in the art will appreciate that the facility may be implemented in a variety of other environments including a single, monolithic computer system or a distributed computer system, as well as various other combinations of computer systems or similar devices connected in various ways.

Figure 2:
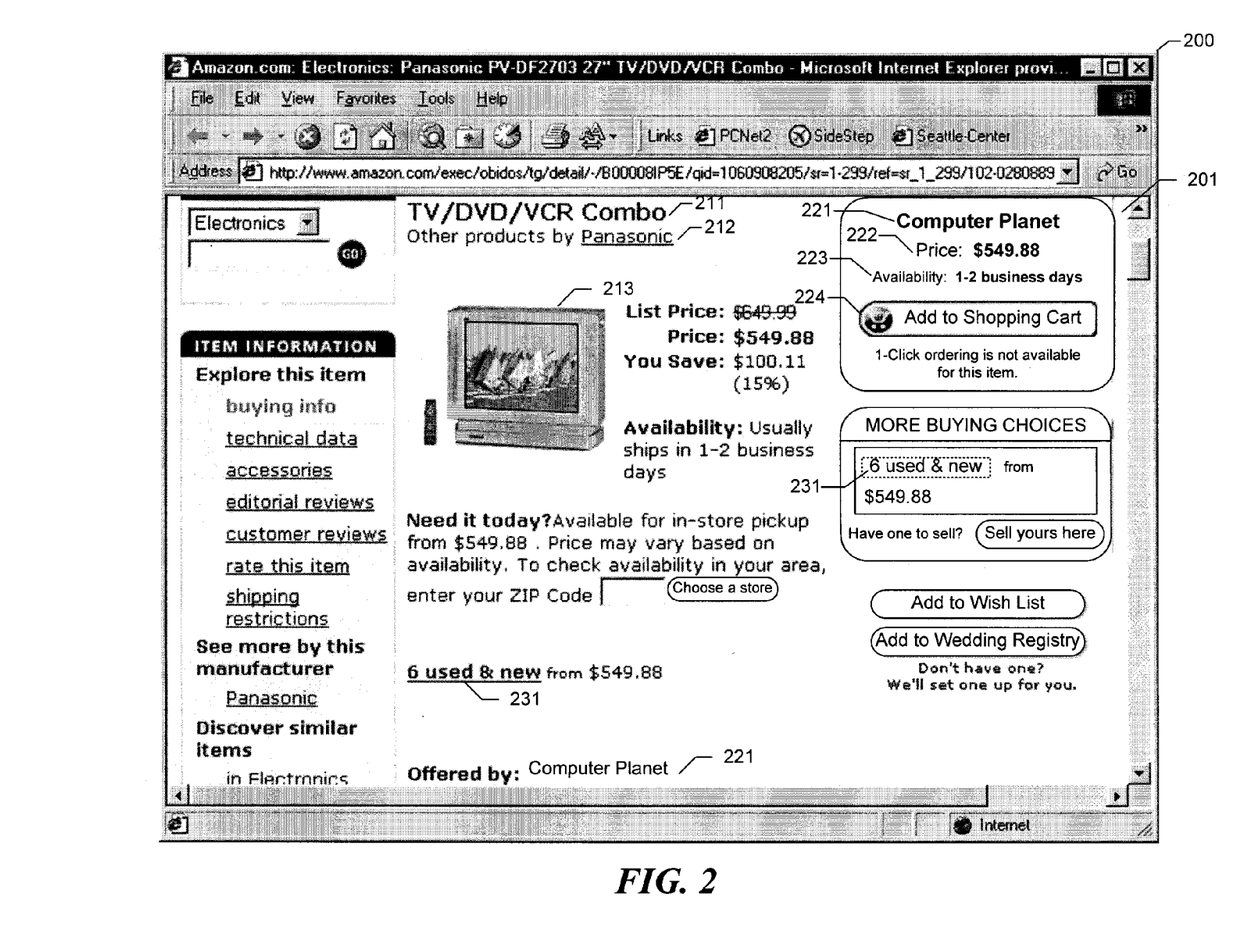
FIG. 2 is a display diagram showing a sample item detail page of a first style generated by the facility.

FIG. 2 is a display diagram showing a sample item detail page of a first style generated by the facility. The item detail page 201 displayed in window 200 includes information identifying the item to which the item detail page relates, including the item's name 211, manufacturer 212, and picture 213. The item detail page further includes an identification 221 of the featured seller selected for this item, as well as the price 222 charged by the featured seller, the featured seller's availability 223 for the item, and a control 224 that the user may activate in order to order the item from the featured seller. The item detail page further includes links 231 for separately displaying a more buying choices page listing other sellers from which the item may be ordered.

Figure 3:
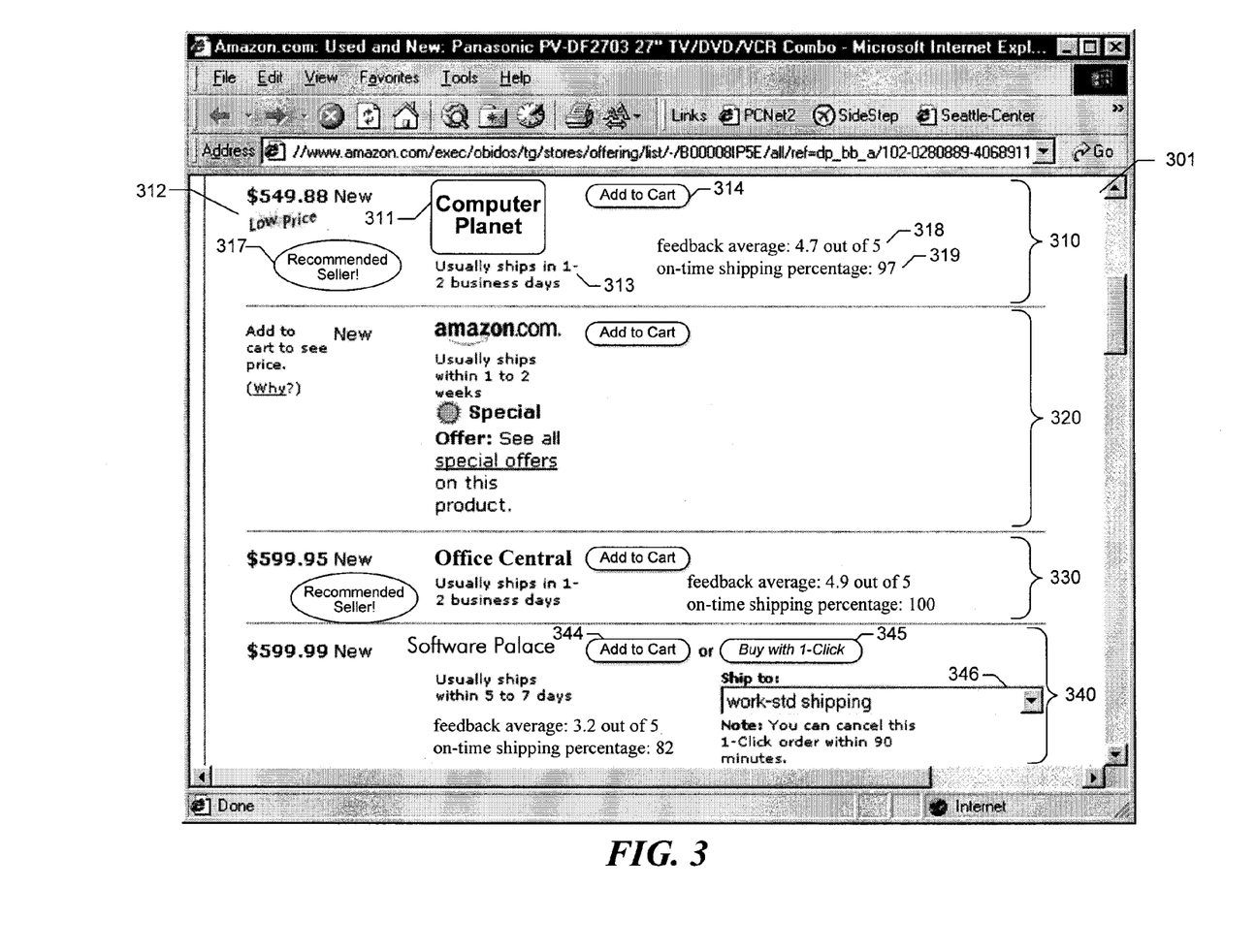
FIG. 3 is a display diagram showing a sample more buying choices page generated by the facility.

FIG. 3 is a display diagram showing a sample more buying choices page generated by the facility. In addition to the featured seller 310, the more buying choices page 301 contains entries for three other sellers from which the item can be ordered: 320, 330, and 340. Each entry contains an indication of the seller, such as indication 311; the price at which the seller is offering an item for sale, such as price 312; an indication of the level of availability of the item from the seller, such as indication 313; and a control for ordering the item from the seller, such as control 314. Some entries contain multiple controls for ordering the item from the seller, such as entry 340, which contains controls 344-346 for ordering the item from this seller. If the user activates control 344, the item is added to the user's shopping cart, and the user can subsequently proceed to check out and finalize an order for the items that have been added to the shopping cart. Alternatively, the user can select a shipping destination using control 346, then activate control 345 in order to order the item from the seller without performing any subsequent interactions. The entries for sellers that have earned the recommended seller designation contain indications of the recommended seller designation, such as indication 317. Several of the entries contain indications of the seller's average feedback rating and on-time shipping percentage, such as indications 318 and 319, respectively. In some embodiments, the facility also visually indicates the entry with the fastest average time from order placement to order shipment with a "quickest shipper" designation (not shown).

Figure 4:
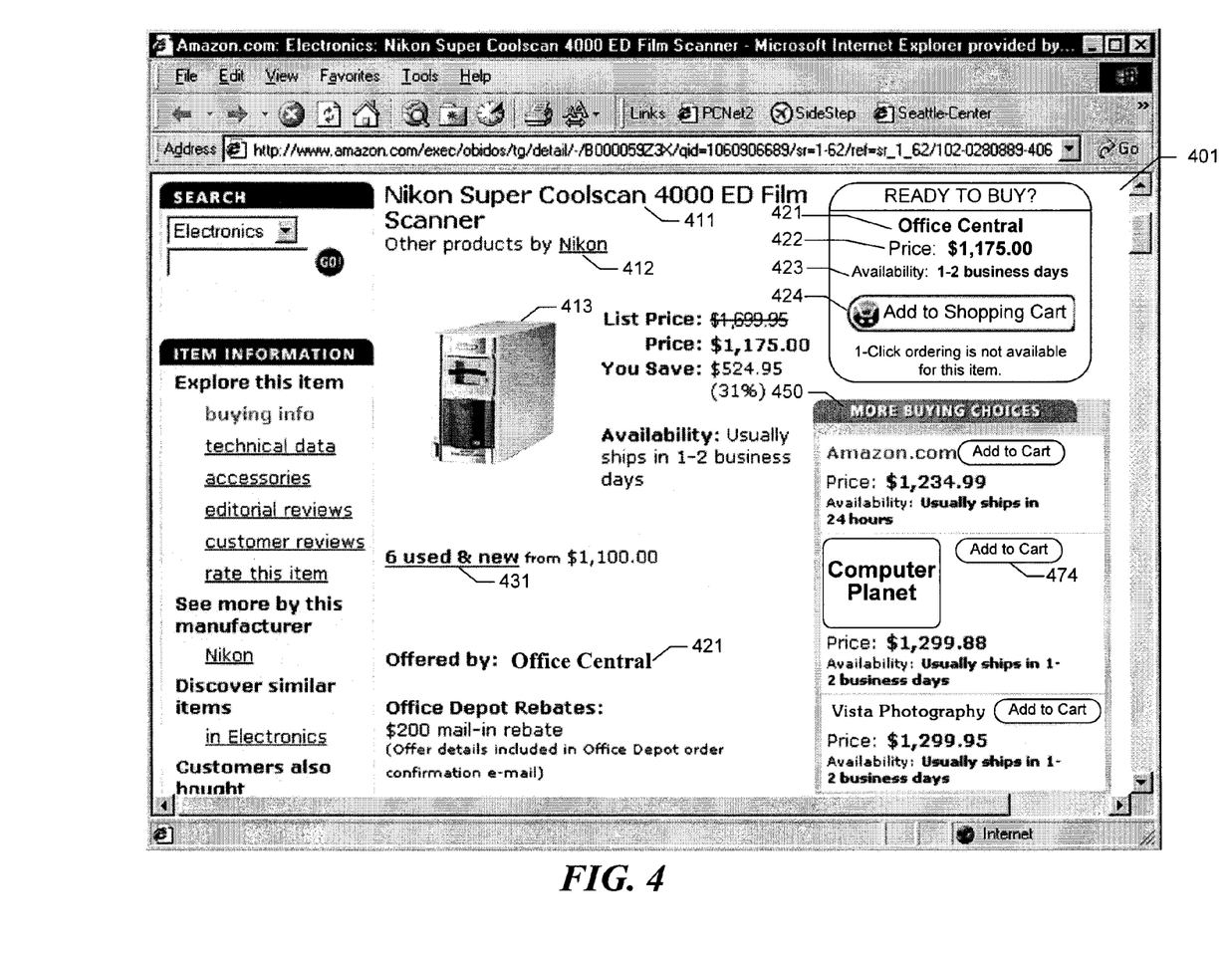
FIG. 4 is a display diagram showing a sample item detail page of a second style generated by the facility.

FIG. 4 is a display diagram showing a sample item detail page of a second style generated by the facility. Like the sample item detail page of the first style shown in FIG. 2, item detail page 401 contains item information 411-413, as well as a control for and information about ordering the item from the featured seller selected by the facility 421-424. In addition to containing a link 431 to a separate "more buying choices" web page containing controls for ordering the item from sellers other than the featured seller, item detail page 401 directly includes a more buying choices section 450 containing a condensed version of the information shown on more buying choices page 301, including controls for ordering the item from sellers other than the featured seller, such as control 474. While these additional controls are displayed on the item detail page together with control 424 for ordering the item from the featured seller, control 424 is larger, bolder, and closer to the top of the page, making it more prominent, and at least somewhat more likely to be activated by the user.

Figure 5:
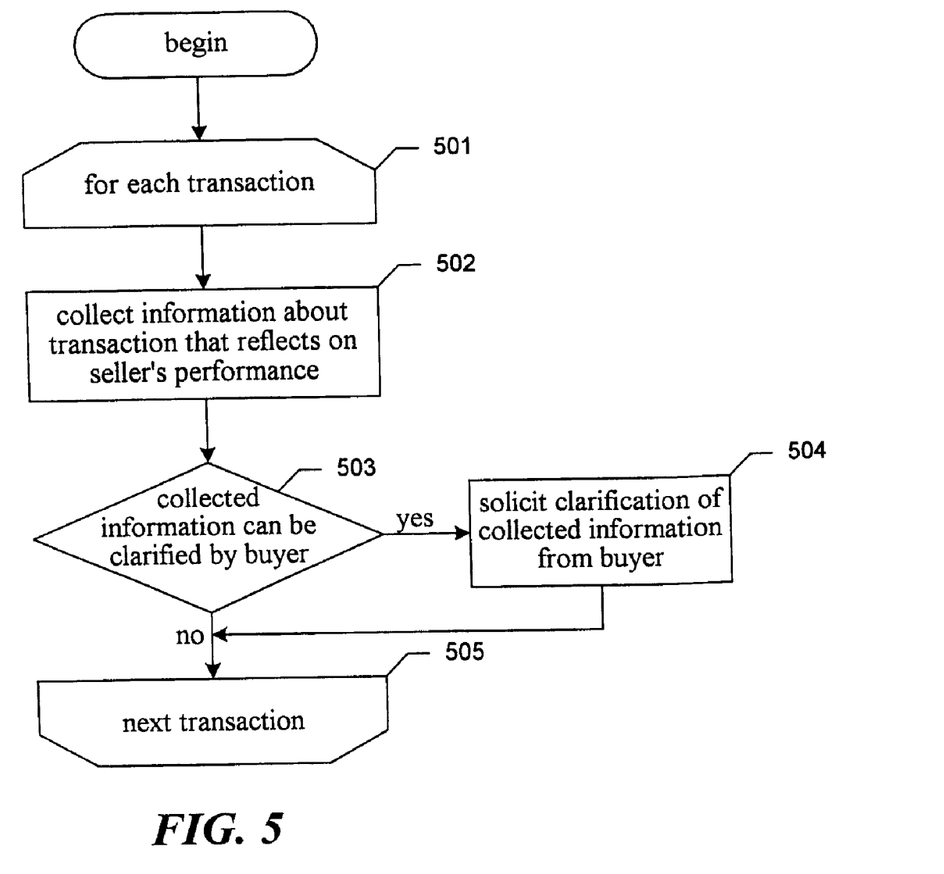
FIG. 5 is a flow diagram showing steps typically performed by the facility in order to collect information used by the facility.

FIG. 5 is a flow diagram showing steps typically performed by the facility in order to collect information used by the facility. In steps 501-505, the facility loops through each item ordering transaction completed in the marketplace. In step 502, the facility collects information about the transaction that reflects on the seller's performance. Operators of conventional marketplaces are sometimes required to rely nearly exclusively on feedback volunteered by buyers in order to monitor seller performance. As the operator of a more information-intensive marketplace, however, the operator of the facility may have access to a variety of additional information about item ordering transactions, including ordering time, order fulfillment time, payment initiation information, payment completion information, seller class, length of participation in the marketplace, number of complaints received by the operator of the marketplace about the seller, number of customer service contacts received by the operator of the marketplace about the seller's transactions, average buyer feedback rating, percentage of buyer feedback ratings that are negative, number of contacts per order, order cancellation rate, refund rate, chargeback rate, guarantee claim rate, other information reflecting bad debt cost of the seller to the marketplace, third-party credit profiling information, and various forms of feedback from both the buyer and the seller. In some cases, the operator of such an information-intensive marketplace may require sellers to send email or other communication to the marketplace confirming key events such as order shipment or customer contact; such information may be communicated from the seller to the marketplace automatically (e.g., through email or through a web service interface); and/or the marketplace may perform certain functions on behalf of the seller that place the marketplace in possession of such information (e.g., the operator of the marketplace may require all customer service contacts to the seller to be made thorough the marketplace). In step 503, if the information collected in step 502 for the transaction can be clarified by the buyer, then the facility continues in step 504, else the facility continues in step 505 to process the next transaction. In step 504, the facility solicits clarification of the collected information from the buyer. Typically, step 504 involves posing a specific question about the transaction for the buyer to answer. The question may be conveyed to the buyer by a variety of means, including via email, via instant message, via automated or manual telephone call or voice mail message, by inclusion on web pages served to this buyer during visits to the marketplace web site or other web sites, etc. This may occur when the information available to the facility is ambiguous, such as where the buyer cancels a transaction after the order was placed, and no information is available about the buyer's reason for cancellation. It may also occur where unambiguous information has been received from the seller than tends to serve the seller's interests, such as an indication from the seller that the buyer cancelled the transaction arbitrarily, as opposed to canceling because of a protracted delay by the seller in shipping the ordered item. It may also occur where historical information about the seller suggests a recurring issue with the seller; for example, for transactions involving a seller that has repeatedly shipped orders late, the facility may query each buyer about whether the shipped order was timely received. After step 504, the facility continues in step 505.

Figure 6:
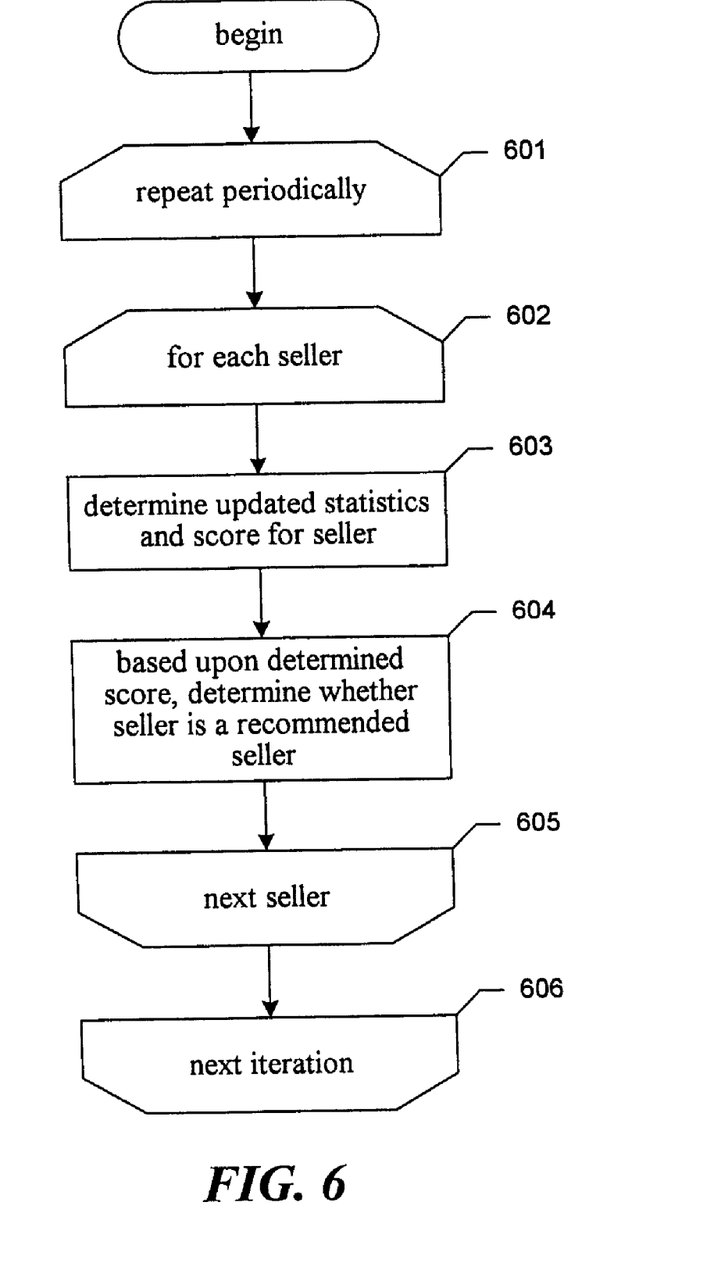
FIG. 6 is a flow diagram showing steps typically performed by the facility in order to periodically rate the sellers participating in the marketplace.

FIG. 6 is a flow diagram showing steps typically performed by the facility in order to periodically rate the sellers participating in the marketplace. In steps 601-606, the facility periodically repeats the rating process, such as daily or weekly. In steps 602-605, the facility loops through each seller participating in the marketplace. In step 603, the facility determines updated statistics and a seller score for the current seller. The statistics determined for the seller in step 603 typically include statistics that are of some significance to buyers considering ordering an item from the seller, such as the average of numerical ratings given to the seller by buyers that have previously ordered from the seller ("feedback average"), and the percentage of orders that the shipper timely ships ("on-time shipping percentage"). Those skilled in the art will appreciate that additional statistics may be tracked for sellers by the facility. The facility further determines a seller score for the seller, based upon a wide variety of information about the seller's performance while participating in the marketplace, such as the information collected in step 502.

In some embodiments, the facility uses the following formula to compute a seller score $S_j$ for each seller:

$$S_j = \sum_{i=1}^{n} w_i \cdot N(a_{i,j})$$

where each value of i corresponds to a different factor considered, each value of j corresponds to a different seller, $a_{i,j}$ is a quantitative measure of a particular factor i for a particular seller j, the function $N(a_{i,j})$ normalizes $a_{i,j}$ by mapping the natural range of $a_{i,j}$ onto the range 1-100 where 100 corresponds to the best seller performance; and $w_i$ is a weight attributed to the $i^{th}$ factor such that $$\sum_{i=1}^{n} w_i = 1$$

In various embodiments, the facility determines a seller score for the seller using time windows of different sizes for the information upon which the seller score is based. For example, the facility may compute the seller scores using quantitative measures for all factors over a period of the foregoing six months, or may use measures for different factors over different periods.

Exemplary factors considered by some embodiments of the facility are listed below. The following terms are employed in identifying these factors:

Feedback: A system of collecting responses from transaction partners regarding their satisfaction with an order. Only ratings from buyers with charged orders are included in the seller rating. Feedback is rated on a 1 to 5 point scale with a rating of 1 being worst and a rating of 5 being best.

Negative Feedback: A feedback rating of 1 or 2 is defined as negative.

Feedback Rating: The average of all buyer feedback over a set time period—ranges from 1 to 5 stars.

Primary Period: The facility uses the level of recent buyer feedback for the seller to determine whether to calculate feedback ratings for the seller over a recent period, or over the seller's entire lifetime.

Guarantee Claims: In some cases, the operator of the marketplace provides a transaction completion guarantee program that provides refunds to buyers for $3^{rd}$ party seller transactions that failed for specific reasons (item never arrived or item misrepresented by the seller). This program helps to safeguard the customer's buying experience. The facility typically considers those transactions where the buyer resorted to filing a claim to be a negative buyer experience (rather than have the seller solve the problem).

Chargebacks: Credit card chargebacks against the operator of the marketplace at the request of the buyer. Only includes service chargebacks (e.g., buyer complaints), not fraudulent chargebacks (e.g., stolen card).

Exemplary factors considered by the facility include:

Count of negative feedback ratings over the past 30 days as a percentage of count of total feedback ratings over the past 30 days.

Count of negative feedback ratings during the primary period but not in the past 30 days as a percentage of count of total feedback ratings during the primary period but not in the past 30 days—this is a longer-term factor than the immediately preceding factor.

Feedback rating over the primary period.

Count of feedback ratings over the primary period.

Count of chargebacks and approved guarantee claims over a certain period as a percentage of count of all transactions over that period.

Other factors as previously described, including percent of orders shipped on or before the anticipated ship date of the seller, number of customer service contacts received by the operator of the marketplace about the seller's transactions as a percentage of all orders, order cancellation rate, etc.

In some embodiments, the facility scales the trust score to soften the impact of the first few feedback ratings while the seller has a small number of feedback ratings. Those skilled in the art will appreciate that a wide variety of other techniques may be used to calculate seller scores.

In step 604, based upon the score determined in step 603, the facility determines whether the seller should be designated as an recommended seller. In some embodiments, this involves comparing the score determined for the seller to a minimum seller score threshold. For example, where the facility utilizes a seller score threshold of 80, those sellers having scores greater than 80 (or, alternatively, greater than or equal to 80) are designated as recommended sellers. In step 605, the facility loops back to step 602 to process the next seller. In step 606, the facility loops back to step 601 through repeat the process of rating the sellers at a future time.

Figure 7:
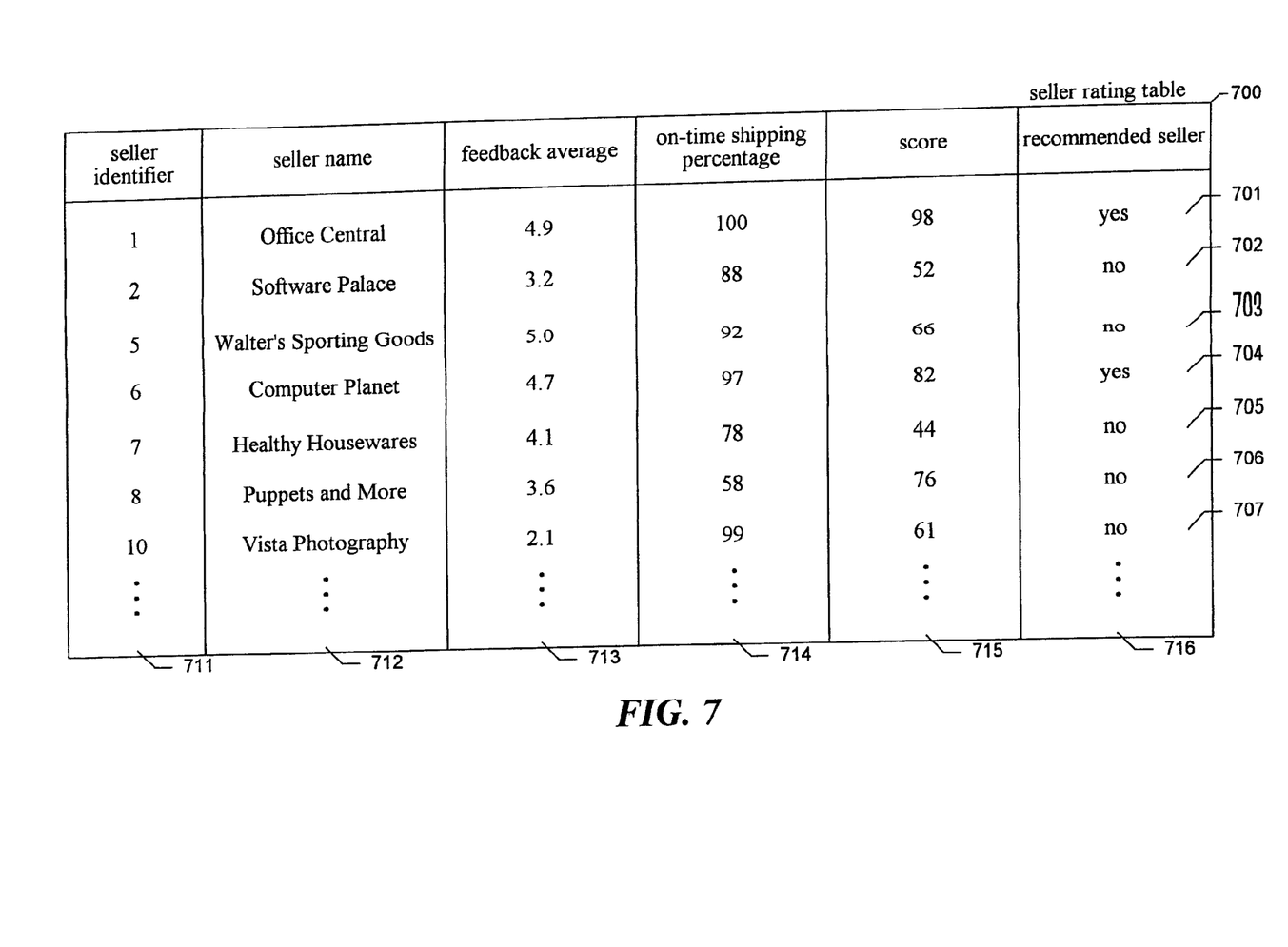
FIG. 7 is a data structure diagram showing a sample seller rating table used by the facility.

FIG. 7 is a data structure diagram showing a sample seller rating table used by the facility to store seller rating information. Table 700 is comprised of a number of rows, such as rows 701-707, each corresponding to a different seller that participates in the marketplace. Each row is divided into six columns: a seller identifier column 711, containing an identifier uniquely identifying the seller; a seller name column 712, containing the seller's name; a feedback average column 713, containing the present average of feedback ratings received for the seller from buyers that have entered into transactions with the seller; an on-time shipping percentage column 714, containing the present on-time shipping percentage for the seller; a score column 715, containing the seller's score most recently calculated for the seller; and an recommended seller column 716, containing an indicating of whether the seller is presently designated to be an recommended seller. As an example, row 701 indicates that the Office Central seller, having seller identifier 1, has a feedback average of 4.9, an on-time shipping percentage of 100, and a seller score of 98, and is presently designated an recommended seller. Those skilled in the art will appreciate that the facility may store this and other data in a variety of different forms and organizations.

Figure 8:
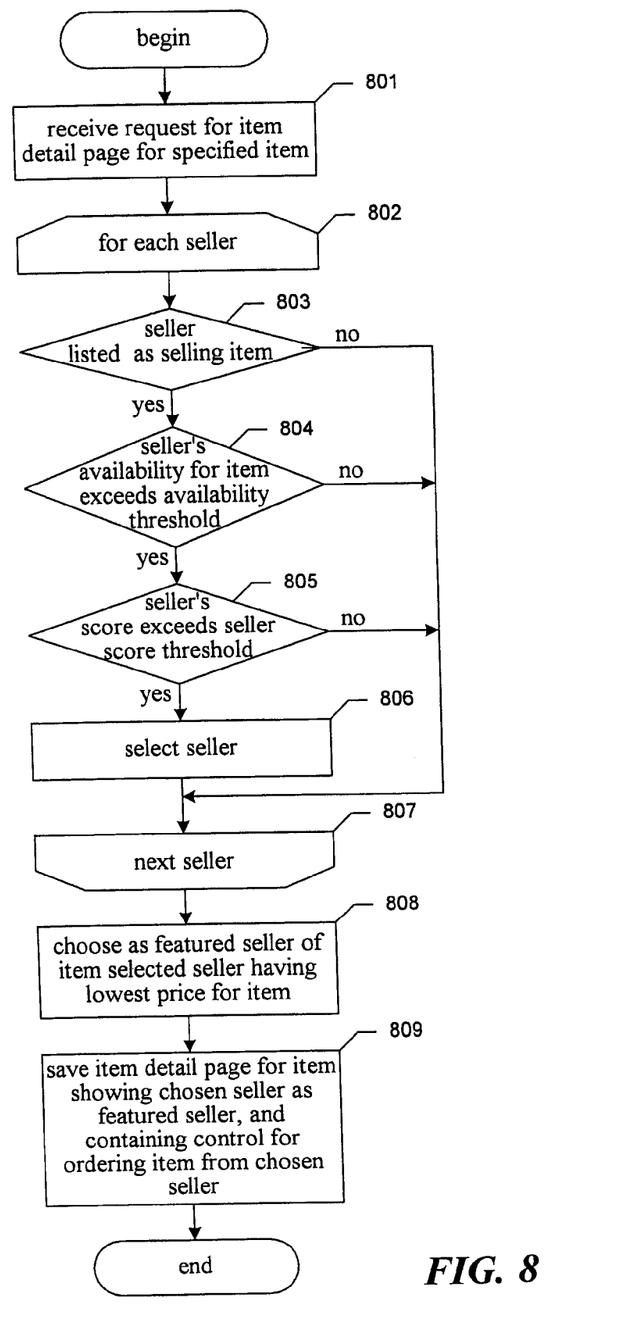
FIG. 8 is a flow diagram showing steps typically performed by the facility in order to generate an item detail page for an item in response to a request from a buyer.

FIG. 8 is a flow diagram showing steps typically performed by the facility in order to generate an item detail page for an item in response to a request from a buyer. In step 801, the facility receives a request for an item detail page for a specified item. In steps 802-807, the facility loops through each seller participating in the marketplace. In step 803, if the seller is listed as selling the item, then the facility continues with step 804, else the facility continues in step 807. In step 804, if the seller's availability for the item exceeds an availability threshold established by the facility, then the facility continues in step 805, else the facility continues in step 807. The facility may establish a variety of different availability thresholds, such as available in four or fewer days. In step 805, if the seller's score exceeds a seller score threshold established by the facility, then the facility continues in step 806, else the facility continues in step 807. The seller score threshold applied in step 805 may be the same seller score threshold applied in step 604, or may be a different seller score threshold. In step 806, the facility selects the current seller as a candidate for a featured seller of the specified item in the context of the requested item detail page. In step 807, the facility loops back to step 802 to process the next seller. In step 808, the facility chooses as the featured seller of the item the seller selected in step 806 having the lowest price for the item. In some embodiments, the facility chooses the featured seller of the item in step 808 using a set of adjusted prices that are based on each selected seller's actual price, but may be positively or negatively adjusted to reflect additional characteristics other than price. For example, the facility may apply a negative price adjustment to a selected seller that is the operator of the marketplace or closely affiliated with the operator of the marketplace, making it more likely that this selected seller to be chosen, and/or may apply a positive price adjustment for a seller whose cost of participation in the marketplace is particularly high, making it less likely that this seller will be chosen. In step 809, the facility serves an item detail page for the item that, in addition to containing information describing the item, shows the seller chosen in step 808 as the featured seller, and contains a control for ordering the item from this seller. This control may be the only ordering control on the item detail page, or it may be the most prominent among multiple ordering controls included on the item detail page. Where the item detail page contains multiple ordering controls, the ordering controls for sellers other than the featured seller may be for sellers that were runners-up in the competition to become the featured seller of this item. In some cases, the multiple ordering controls may each correspond to a seller that excels at a particular seller role, such as "least-expensive dependable seller," or "fastest-shipping seller," etc. After step 809, these steps conclude. Various embodiments of the facility use sets of steps other than those shown in FIG. 8 to provide similar functionality.

In various embodiments, the facility uses the seller scores it determines for a variety of other purposes. These include automatically suspending sellers with a low score; displaying a warning to buyers about a seller with a low score; filtering search results, such as offers to sell, based upon the seller score of the seller to which each item in the search result corresponds; filtering a search result based upon the seller score of the seller to which each item of the search result corresponds; selecting, among a group of sellers all seeking to provide particular content to be displayed within the marketplace, such as an item description, the seller in the group having the highest seller score; determining whether to extend a periodic transaction limit imposed on sellers by the marketplace, effectively increasing the level of credit extended to sellers by the marketplace; etc.

It will be appreciated by those skilled in the art that the above-described facility may be straightforwardly adapted or extended in various ways. For example, embodiments of the facility may be used for marketplaces, sellers, buyers, and items of all kinds. The facility may use a variety of different eligibility requirements for recommended seller designation or selection as featured seller. The facility may use a variety of other names or images to characterize recommended sellers and featured sellers. The facility may adjust seller statistics and scores at virtually any frequency, or continuously. Similarly, the facility may determine the featured seller for an item or group of items on a basis other than in response to each item detail page request. While the foregoing description makes reference to preferred embodiments, the scope of the invention is defined solely by the claims that follow and the elements recited therein.

What is claimed is:

1. A method, utilizing a computing device, for evaluating the performance of a seller, comprising:

storing information relating to one or more sales transactions by a seller obtained by facilitating the transactions for the seller, wherein the information relating to one or more sales transactions by the seller includes information from a source other than buyers of items from the seller;

retrieving, using the computing device, stored information relating to a plurality of factors including at least one factor other than a buyer rating, wherein the stored information includes the information from the source other than buyers of items from the seller, to be incorporated in a score assessing the performance of the seller;

identifying, using the computing device, a portion of the retrieved information relating to a distinguished factor of the plurality of factors that is unresolved, the unresolved portion relating to completion, with respect to a cancellation or a timing of a delivery, by the seller of the sale of a distinguished item to a distinguished buyer;

transmitting over a network to the distinguished buyer of the distinguished item a request for additional information relating to completion by the seller of the sale of the distinguished item that resolves the unresolved distinguished factor;

receiving over the network additional information from the distinguished buyer, the additional information relating to completion by the seller of the sale of the distinguished item that resolves the unresolved distinguished factor; and generating, using the computing device, a score assessing the performance of the seller using both the retrieved information and the received additional information, wherein the score is calculated based at least in part on the at least one factor other than the buyer rating and the received additional information from the buyer relating to completion by the seller of the sale of the distinguished item and corresponding weighting factors, wherein the score is used, at least in part, in determining how the seller is promoted in an online marketplace.

2. The method of claim 1, wherein the retrieved information relating to the distinguished factor reflects ambiguously on the seller's performance in completing the sale of the distinguished item to the distinguished buyer.

3. The method of claim 1, wherein the retrieved information relating to the distinguished factor was received from the seller.

4. The method of claim 1, wherein the retrieved information relating to the distinguished factor was received from the seller and enhances the score assessing the performance of the seller.

5. The method of claim 1, wherein the request is transmitted to the distinguished buyer for additional information at least partly in response to the buyer canceling a transaction with the seller.

6. The method of claim 1, wherein the request is transmitted to the distinguished buyer for additional information at least partly in response to determining that the seller that has repeatedly had late shipped orders.

7. The method of claim 1, wherein determining how the seller is promoted in the online marketplace, comprises at least one of the following:
   suspending the seller from selling;
   providing feedback to buyers related to the score;
   filtering search results, including offers to sell, based at least on the seller score;
   selecting the seller from a group of sellers seeking to provide particular content to be displayed via the online marketplace;
   determining whether to extend a periodic transaction limit imposed on the seller.

8. A tangible, non-transitory computer-readable medium having computer-executable instructions stored thereon that, if executed by a computing device, cause the computing device to perform operations comprising:
   storing information relating to one or more sales transactions by a seller obtained by facilitating the transactions for the seller, wherein the information relating to one or more sales transactions by the seller includes information from a source other than buyers of items from the seller;
   retrieving, using the computing device, stored information relating to a plurality of factors including at least one factor other than a buyer rating, wherein the stored information includes the information from the source other than buyers of items from the seller, to be incorporated in a score assessing the performance of the seller;
   identifying, using the computing device, a portion of the retrieved information relating to a distinguished factor of the plurality of factors that is unresolved,
      the unresolved portion relating to completion, with respect to a cancellation or a timing of a delivery, by the seller of the sale of a distinguished item to a distinguished buyer;
   transmitting over a network to the distinguished buyer of the distinguished item a request for additional information relating to completion by the seller of the sale of the distinguished item that resolves the unresolved distinguished factor;
   receiving over the network additional information from the distinguished buyer,
      the additional information relating to completion by the seller of the sale of the distinguished item that resolves the unresolved distinguished factor; and
   generating, using the computing device, a score assessing the performance of the seller using both the retrieved information and the received additional information, wherein the score is calculated based at least in part on the at least one factor other than the buyer rating and the received additional information from the buyer relating to completion by the seller of the sale of the distinguished item and corresponding weighting factors,
   wherein the score is used, at least in part, in determining how the seller is promoted in an online marketplace.

9. The tangible, non-transitory computer-readable medium of claim 8, wherein the retrieved information relating to the distinguished factor reflects ambiguously on the seller's performance in completing the sale of the distinguished item to the distinguished buyer.

10. The tangible, non-transitory computer-readable medium of claim 8, wherein the retrieved information relating to the distinguished factor was received from the seller.

11. The tangible, non-transitory computer-readable medium of claim 8, wherein the retrieved information relating to the distinguished factor was received from the seller and enhances the score assessing the performance of the seller.

12. The tangible, non-transitory computer-readable medium of claim 8, wherein the request is transmitted to the distinguished buyer for additional information at least partly in response to the buyer canceling a transaction with the seller.

13. The tangible, non-transitory computer-readable medium of claim 8, wherein the request is transmitted to the distinguished buyer for additional information at least partly in response to determining that the seller that has repeatedly had late shipped orders.

14. The tangible, non-transitory computer-readable medium of claim 8, wherein determining how the seller is promoted in the online marketplace, comprises at least one of the following:
   suspending the seller from selling;
   providing feedback to buyers related to the score;
   filtering search results, including offers to sell, based at least on the seller score;
   selecting the seller from a group of sellers seeking to provide particular content to be displayed via the online marketplace;
   determining whether to extend a periodic transaction limit imposed on the seller.

15. An apparatus, comprising:
   a computing device;
   a tangible, non-transitory computer-readable medium having computer-executable instructions stored thereon that, if executed by the computing device, cause the computing device to perform operations comprising:
      storing information relating to one or more sales transactions by a seller obtained by facilitating the transactions for the seller, wherein the information relating to one or more sales transactions by the seller includes information from a source other than buyers of items from the seller;
      retrieving, using the computing device, stored information relating to a plurality of factors including at least one factor other than a buyer rating, wherein the stored information includes the information from the source other than buyers of items from the seller, to be incorporated in a score assessing the performance of the seller;
      identifying, using the computing device, a portion of the retrieved information relating to a distinguished factor of the plurality of factors that is unresolved, the unresolved portion relating to completion, with respect to a cancellation or a timing of a delivery, by the seller of the sale of a distinguished item to a distinguished buyer;

transmitting over a network to the distinguished buyer of the distinguished item a request for additional information relating to completion by the seller of the sale of the distinguished item that resolves the unresolved distinguished factor;

receiving over the network additional information from the distinguished buyer, the additional information relating to completion by the seller of the sale of the distinguished item that resolves the unresolved distinguished factor; and generating, using the computing device, a score assessing the performance of the seller using both the retrieved information and the received additional information, wherein the score is calculated based at least in part on the at least one factor other than the buyer rating and the received additional information from the buyer relating to completion by the seller of the sale of the distinguished item and corresponding weighting factors, wherein the score is used, at least in part, in determining how the seller is promoted in an online marketplace.

16. The apparatus of claim 15, wherein the retrieved information relating to the distinguished factor reflects ambiguously on the seller's performance in completing the sale of the distinguished item to the distinguished buyer.

17. The apparatus of claim 15, wherein the retrieved information relating to the distinguished factor was received from the seller.

18. The apparatus of claim 15, wherein the request is transmitted to the distinguished buyer for additional information at least partly in response to the buyer canceling a transaction with the seller.

19. The apparatus of claim 15, wherein the request is transmitted to the distinguished buyer for additional information at least partly in response to determining that the seller that has repeatedly had late shipped orders.

20. The apparatus of claim 15, wherein determining how the seller is promoted in the online marketplace, comprises at least one of the following:
- suspending the seller from selling;
- providing feedback to buyers related to the score;
- filtering search results, including offers to sell, based at least on the seller score;
- selecting the seller from a group of sellers seeking to provide particular content to be displayed via the online marketplace;
- determining whether to extend a periodic transaction limit imposed on the seller.

* * * * *